Dec. 14, 1954  E. S. SHEPARD  2,697,203
IMPEDANCE MEASURING DEVICE
Filed Oct. 26, 1950  2 Sheets-Sheet 1
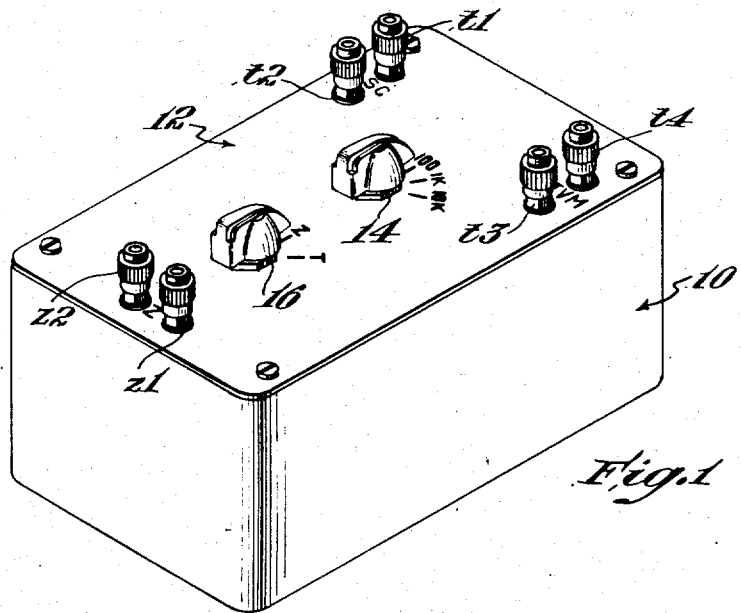
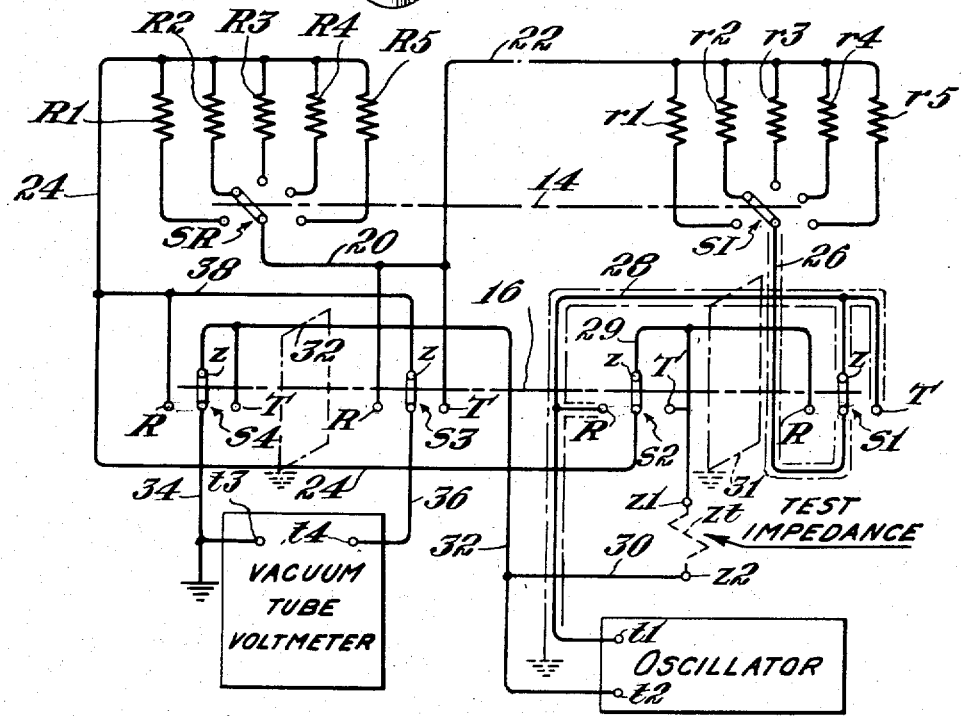
Fig. 2
T — V reads across (R+Z)
Z — V reads across Z
R — V reads across R
Inventor
Edward S. Shepard
by Roberts, Cushman & Grover
Attys.
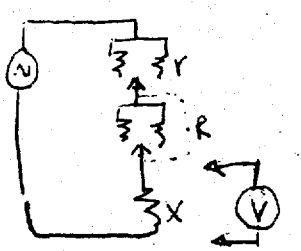

United States Patent Office 2,697,203
Patented Dec. 14, 1954

2,697,203

IMPEDANCE MEASURING DEVICE

Edward S. Shepard, Phoenix, Ariz., assignor to Trustees of Boston College, Newton, Mass.

Application October 26, 1950, Serial No. 192,274

8 Claims. (Cl. 324—57)

This invention relates to electrical measuring instruments and more particularly to instruments of the type for measuring electrical impedance.

Objects of this invention are to provide an impedance measuring device which determines the impedance of resistors, capacitors, chokes, loud speakers and similar circuit elements throughout a wide range of frequencies, which determines the resonant frequency of both series and parallel circuits, which detects the changes in impedance of transducers resulting from loading, mechanical motion, temperature and other external conditions, which measures of the impedance of vacuum tube circuits under operating conditions, which measures the leakage reactance and mutual inductance of a transformer, which is a precision instrument, which can be used at frequencies of 100 kilocycles and greater, which measures impedances of 20,000 ohms at a frequency of one kilocycle with an error of less than 2%, which does not require a skilled operator, which can be used for production control, which requires only direct current elements in its circuit; which does not require a battery or other auxiliary source of direct potential, which is simple and economical to manufacture, which is rugged and does not require calibration, and which advances the electrical art generally.

In a broad aspect the invention contemplates a device for measuring the electrical impedance, comprising one or more standard resistors which are selectively connected in series with a correlated current limiting resistor and the impedance being tested between a pair of input terminals which are adapted to be connected to a source of alternating power such as an oscillator or a sweep circuit generator. By connecting a selected one of a plurality of standard resistors, which has approximately the same ohmic value as the impedance being tested, the range of the device is greatly extended without sacrifice of accuracy. The accuracy of the device is further increased by changing the current limiting resistor when the standard resistor is changed so that the ratio of the ohmic value of the current limiting resistor to the standard resistor remains a constant, for example 100:1 regardless of the standard resistor selected. Such changing of the resistors is preferably carried out simultaneously for example by plugging or the use of a multiposition gang range selector switch having two switch units or elements each of which comprises a plurality of stationary contacts and a movable contact, the movable contacts being mechanically linked so that they move simultaneously to the corresponding switch positions. One end of each of the standard resistors is connected to a respective stationary contact of one of the switch units. The movable contact of the same switch unit is joined to one end of each of the current limiting resistors. The opposite end of each limiting resistor is connected to a corresponding stationary contact of the second switch unit whose movable contact is connected through the test impedance to one input terminal connecting to the power source. The opposite end of each of the standard resistors is connected to the other input terminal so that the power source is connected in series with the test impedance, a standard resistor and its correlated current limiting resistor determined by the position of the gang switch.

Switch means are provided for selectively connecting a sensitive voltmeter, for example a cathode ray oscillograph or vacuum tube voltmeter to measure the individual and total voltage drops across the standard resistor and the test impedance. In a more specific aspect such switching means is a four pole three position gang switch with four separate switch units or elements. Each of the switch elements has three stationary contacts and an associated movable contact which moves into corresponding positions conjointly with the three movable contacts of the other associated switch elements. The movable contact of the first switch element is directly linked to the movable element of the second switch unit of the range selector switch so that it can be selectively connected to the desired standard resistor. The movable contact of the second switch element is connected to the ends of the standard resistors. The first stationary contact of the second switch element and the second and third stationary contacts of the first switch element are connected to one of the input terminals of the power source. The other input terminal is connected through the impedance being tested to both the second and third stationary contacts of the second switch element and the first stationary contact of the first switch element so that in each position of the voltameter switch the circuits completed between the power source input terminals have substantially the same total impedance thus maintaining a substantially constant current flow through the test impedance. The third and fourth switch elements of the voltmeter switch are used to connect the voltmeter so that the separate or individual voltage drops across the selected standard resistor and test impedance and the total voltage drop across the standard resistor and the impedance when connected in series are measured thereby. To this end the movable contacts of the third and fourth switch elements are connected respectively to the terminals of the voltmeter. The first and third stationary contacts of the third switch element are joined to the common connection to the current limiting resistors and the movable contact of the first switch unit of the range selector switch. The first stationary contact of the fourth switch element and the second stationary contact of the third switch element are connected to the movable contact of the second switch element which is also linked to the common ends of the standard resistors whereby the three positions of the voltmeter switch connect the voltmeter so that it measures respectively the voltage drop across the selected standard resistor, the voltage drop across the test impedance, and the total voltage drop across the resistor and impedance.

These and other objects and aspects will be apparent from the following description in an illustrative specific embodiment of the invention referring to a drawing in which Fig. 1 is an isometric view of the impedance measuring device;

Fig. 2 is a wiring diagram of one embodiment of the device; and

Figure 3:
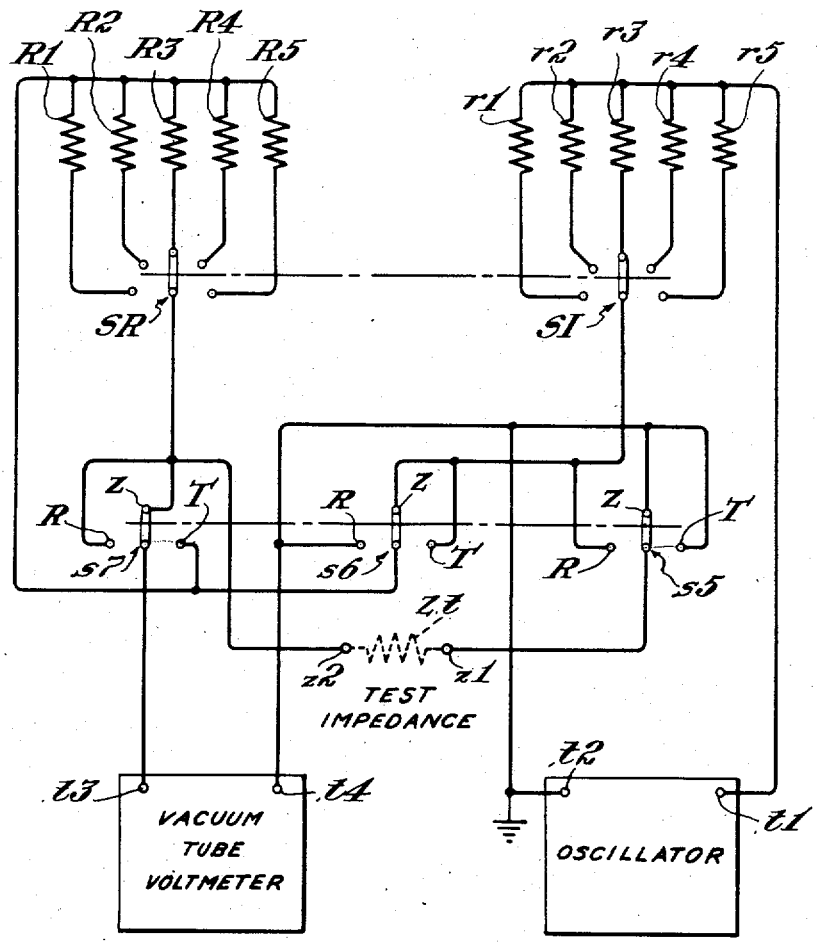
Fig. 3 is a wiring diagram of a second embodiment.

In the first embodiment of the invention chosen for the purposes of illustration, the test impedance $Z_t$ (Fig. 2) is connected by means of two terminals such as binding posts $Z1$ and $Z2$ which are conveniently located upon the top of one end of a cover 12 for a casing 10 such as is shown in Fig. 1. At the opposite end of the cover 12 are provided four additional binding posts, one pair of which are designated $t1$ and $t2$ and are used as terminals for connecting a source of alternating power such as an oscillator or sweep circuit generator. The second pair of binding posts $t3$ and $t4$ accommodate the leads from a voltage measuring device such as a vacuum tube voltmeter (Fig. 2). Also extending from the top of the cover 12 are two handles or knobs 14 and 16 which with their associated shafts (not shown) are actuators for transferring respectively the contacts of a range selector switch and a voltmeter switch as will be described in detail hereinafter.

The range selector switch comprises two electrically isolated switch units SR and SI. Each of the switch units comprises five stationary contacts which are selectively contacted by a movable contact to complete an electrical circuit therebetween. Each of the movable contacts is operated conjointly with the other movable contact by means of the actuator 14 so that corresponding stationary contacts of both switch units are contacted simultaneously. Each of the stationary contacts of the switch unit SR is connected to one end of a respective one of five standard resistors R1—R5 which are accurately calibrated and used as the basic measuring standards. The movable contact of the switch unit SR is connected by means of the conductors 20 and 22 to one end of each of five current limiting resistors designated r1—r5 in Fig. 2. The opposite end of each of the current limiting resistors r1—r5 is connected to a respective stationary contact of the switch unit SI. From the above it will be apparent that the operation of the ganged switch units SR and SI of the range selector switch by means of the actuator 14 connects a selected one of the standard resistors R in series with a corresponding current limiting resistor r. To minimize variations in calibration the resistors are preferably chosen so that in all ranges the ratio of the ohmic value of the current limiting resistor r to the selected standard resistor R is maintained a constant. Resistors having the ohmic values such as are tabulated in the following table which give a 100:1 ratio are recommended.

| | |
|---|---|
| R1—1w | r1—100w |
| R2—10w | r2—1k |
| R3—100w | r3—10k |
| R4—1k | r4—100R |
| R5—10k | r5—1M |

The opposite ends of the standard resistors R1—R5 from those ends connected to the stationary contacts of the switch unit SR as described above are connected together by means of a common lead 24 which also is linked with the movable contact of a switch element S2 of the voltmeter switch. The movable contact of the switch unit SI is directly linked to the movable contact of the voltmeter switch element S1 by means of a shielded conductor 26. The stationary contacts designated Z and T of the switch element S1 and the stationary contact R of the switch unit S2 are connected by means of a shielded conductor 28 with the input terminal t1 which is adapted also to connect with an oscillator or other alternating power source. The stationary contact R of the switch element S1 and the stationary contacts Z and T of the switch element S2 are linked by a conductor 29 to the terminal z1 of the test impedance Zt. The other terminal z2 of the test impedance Zt connects to the other input terminal t2 by means of the conductors 30 and 32. In addition to the shielding of the conductors 26 and 28, shields such as the grounded metal plates 31 are interposed between the switch elements S2 and S3 and the switch elements S1 and S4 thereby to further reduce stray capacitance coupling.

From the above it will be apparent that when the actuator 16 of the voltmeter switch is in the position shown wherein the movable contacts of the switch elements S1 and S2 contact the respective stationary contacts Z, a circuit is completed between the input terminals t1 and t2 which includes the conductor 28, the contacts of the switch unit S1, the current limiting resistor r1—r5 determined by the position of the range selector switch, the conductors 22 and 20, the contacts of the switch unit SR, the selected standard resistor R1—R5 which is also determined by the position of the range selector switch, the conductor 24, the contacts of switch element S2, the conductor 29, the test impedance Zt and the conductors 30 and 32 to the oscillator terminal t2. When the voltmeter switch actuator 16 is in such a position that the movable contacts of the switch elements S1 and S2 are in position to make with the respective stationary contacts designated R, a circuit is completed from the input terminal t1 through the conductor 28, the contacts of the switch element S2; the conductor 24, the selected standard resistor R1—R5, the range selector switch unit SR, the conductors 20 and 22, the corresponding current limiting resistor r1—r5, the range selector switch unit SI, the conductor 26, the switch element S1, the conductor 29, the test impedance Zt and the conductors 30 and 32 to the input terminal t2. When the voltmeter switch actuator 16 is in a position wherein the movable contacts of the switch elements S1 and S2 contact the respective stationary contact designated T a circuit is completed including the input terminal t1, the conductor 28, the contacts of the switch element S1, the conductor 26, the range selector switch unit SI, the selected current limiting resistor r1—r5, the conductors 22 and 20, the range selector switch unit SR, the standard resistor R1—R5, the conductor 24, the voltmeter switch element S2, the conductors 30 and 32 to the input terminal t2. From the above it will be apparent that in each of the series circuits completed between the input terminals t1 and t2 in each of the three respective positions of the voltmeter switch the total series impedance is substantially the same, and that therefore with a constant voltage power source the current through the test impedance Zt is independent of the position of the voltmeter switch.

The terminals t3 and t4 which are adapted to connect with the leads to the voltmeter are also coupled by the conductors 34 and 36 with the movable contacts of the voltmeter switch elements S4 and S3 respectively. The stationary contacts designated R and T of the voltmeter switch element S3 are coupled to the conductors 20 and 22 which complete the circuit between the movable contact of the range selector switch unit SR and the common ends of the current limiting resistors r1—r5. The stationary contact Z of the switch element S3 and the stationary contact R of the switch element S4 are connected by means of a conductor 38 with the conductor 24 which extends between the common ends of the standard resistors R1—R5 and the movable contact of the switch element S2 as has been described heretofore. The stationary contacts Z and T of the switch element S4 are connected by means of the conductor 32 with the input t2.

From the above it will be apparent that with the voltmeter switch actuator 16 in the position wherein the movable contacts make with the stationary contacts R, the voltmeter terminal t3 is connected with the common end of the standard resistors R2—R5 by means of a circuit including the conductor 34, the switch element S4, the conductor 38, and the conductor 24. The voltmeter terminal t4 is connected with the opposite end of the selected resistor R1—R5 by means of a circuit including the conductor 36, the switch element S3, the conductor 20 and the selector switch unit SR. In other words with the voltmeter switch in the position designated R, the voltmeter reads the voltage drop across the selected standard resistor R1—R5. With the voltmeter switch in the position designated Z the terminal t3 is connected with the terminal Z2 of the test impedance Zt by means of a circuit including the conductor 34, the switch element S4, and the conductors 32 and 30. The voltmeter terminal t4 is connected with the opposite terminal Z1 of the test impedance Zt by means of a circuit including the conductor 36, the switch element S3, the conductors 38 and 24, the switch element S2 and the conductor 29 so that the voltmeter reads the voltage drop across the test impedance. With the voltmeter switch in position so that the movable contacts make with the stationary contacts designated T, the voltmeter terminal t3 is again connected with the terminal Z2 of the test impedance Zt by means of a circuit similar to that described above and including the conductor 34, the switch element S4, and the conductors 32 and 30. The voltmeter terminal t4 is connected with the end of the selected standard resistor R1—R5 by means of a circuit including the conductor 36, the switch element S3, the conductor 20 and the selector switch unit SR so that the voltmeter indicates the total series voltage drop across both the selected standard resistor R1—R5 and the test impedance Zt.

As described above, the test impedance element Zt whose characteristics are to be measured is connected to the terminals Z1 and Z3. A voltmeter (or cathode ray oscilloscope) having a high input impedance (500k or greater) is coupled to the output terminals t3 and t4, the input terminals t1 and t2 being connected to an alternating power source such as an oscillator. A standard resistor from the group of resistors R1—R5 having an ohmic value approximating that of the test impedance Zt is selected empirically by means of the range selector switch, the resistor selected being that which gives the least difference in the voltmeter readings as the voltmeter switch is transferred from the "Z" position to the "R" position so that the scale error of the voltmeter is minimized.

As the current through the selected standard resistor R1—R5 and the test impedance Zt remain constant irrespective of the position of the voltmeter switch, as discussed in detail heretofore, the following relationship holds:

$$I = Er/R = Ez/Zt \qquad (1)$$

and $$Zt = R/Er \cdot Ez \qquad (2)$$

where:

$Zt$ = the impedance value of test impedance
$R$ = the resistive value of standard resistor
$Ez$ = the potential drop across the test impedance
$Er$ = the potential drop across the standard resistor It will be apparent that $Er$ and $Ez$ are read directly upon the voltmeter when the voltmeter switch is in the positions designated "R" and "Z" respectively. If the current I is regulated for example by changing the output voltage of the power source or by means of an auxiliary regulating potentiometer (not shown) so that the ratio of $R/Er$ is equal to unity, the ohmic value of the impedance $Zt$ can be read directly upon the voltmeter scale. Otherwise the values of $Er$ and $Ez$ obtained by reading the voltmeter and the value of R obtained from the scale upon the top of the cover 10 associated with the knob of range selector switch actuator 14 must be substituted in the above Equation 2 so that the equation can be solved for Z. The value of total series voltage drop $Et$ across the standard resistor and the test impedance is read upon the voltmeter when the voltmeter switch is in the position "T" so that when desired the resistive and reactive components of the impedance $Zt$ can be determined either graphically or algebraically from the vector expression:

$$Et = Er + Ez \qquad (3)$$

The above mentioned measurements can also be made by means of a second embodiment whose circuit components are connected according to the wiring diagram shown in Fig. 3. In this second embodiment the standard resistors R1—R5 and the current limiting resistors r1—r5 are selectively connected by means of a range selector switch having two switch units SR and SI so that the ratio of the ohmic values of corresponding standard and current limiting resistors remains a constant as was described in detail heretofore with respect to the first embodiment of the invention. In the second embodiment the voltmeter switch has three switch elements s5, s6 and s7 operated conjointly, so that the movable contact of each makes selectively with three stationary contacts designated R, T and Z respectively.

The joined ends of the current limiting resistors r1—r5 are connected to an alternating power source such as an oscillator by means of an input terminal t1. The other input terminal t2 is connected with the contacts T and Z of the first voltmeter switch element s5 and the contact R of the second switch element s6. The movable contact of the first selector switch unit SI is connected with the contacts Z and T of the second switch element s6 and the contact R of the first switch element s5. The movable contact of the second switch unit SR connects with the stationary contacts R and Z of the third voltmeter meter switch element s7 and with the terminal z2 of the test impedance Zt. The other terminal z1 of the test impedance Zt is linked with the movable contact of the first switch element s5. The lead which joins the ends of the standard resistors R1—R5 branches to connect with the stationary contact T of the third switch element s7 and the movable contact of the second switch element s6. The terminals t3 and t4 for connecting with a vacuum tube voltmeter are coupled respectively to the movable contact of the third switch element s7 and the input terminal t2.

When the voltmeter switch in the above described embodiment is in the "R" position, a circuit is completed between the oscillator terminals which includes the terminal t1, the current limiting resistor r1—r5 determined by the position of the range selector switch unit SI, the voltmeter switch element s5, the test impedance Zt, the correlated standard resistor R1—R5 determined by the position of the range selector switch unit SR, and the switch element s6 to the terminal t2. The switch element s7 conjointly connects the terminal t3 of the voltmeter with the common connection between the test impedance terminal z2 and the movable contact of the switch unit SR so that the meter measures the voltage drop across the selected standard resistor. By shifting the voltmeter switch to the position "Z" the same circuit elements are reconnected to complete a circuit including t1, the selected current limiting resistor r1—r5, SI, s6, the corresponding standard resistor R1—R5, SR, Zt and s5 to the terminal t2. It will be noted that these are equivalent identical circuit components to those in position "R" but reconnected in a different series sequence so that the current flow remains substantially constant in either position of the voltmeter switch. The voltmeter switch element connects the terminal t3 of the voltmeter to the common point between the movable contact of the switch unit SR and the test impedance terminal z2 so that the meter is connected in parallel with the test impedance $Zt$. In the "T" position of the voltmeter switch, the sequence of the components in the series circuit between the oscillator terminals t1 and t2 is not changed, but the switch element s7 reconnects the voltmeter terminal t3 to the common point between the ends of the standard resistors R1—R5 and the movable contact of the switch element s6 so that the meter reads the total voltage drop across the test impedance $Zt$ and the selected standard resistor.

It should be understood that the present disclosure is for the purpose of illustration only and that this invention includes all modifications and equivalents which fall within the scope of the appended claims.

I claim:

1. An impedance measuring device comprising a pair of terminals adapted to be connected to an alternating power source, a standard resistor, a current limiting resistor, means for directly and non-reactively connecting the impedance to be measured and said terminals in series with the standard resistor and the current limiting resistor, and switching means for selectively connecting directly and non-reactively a voltmeter across the standard resistor, across the impedance to be measured, and across the standard resistor and the impedance to be measured in series, respectively, to measure the individual and total voltage drops.

2. An impedance measuring device comprising a pair of terminals adapted to be connected to an alternating power source, a plurality of standard resistors, a plurality of current limiting resistors each of which is correlated with one of the standard resistors, means for directly and non-reactively connecting the impedance to be measured and said terminals in series with a selected standard resistor and its correlated limiting resistor, and switching means for selectively directly and non-reactively connecting a voltmeter across the selected standard resistor, across the impedance to be measured, and across the selected standard resistor and the impedance to be measured in series, respectively, to measure the individual and total voltage drops.

3. An impedance measuring device comprising a pair of terminals adapted to be connected to an alternating power source, a plurality of standard resistors, a plurality of current limiting resistors, a range selector switch for selectively connecting each of the standard resistors with a respective current limiting resistor having an ohmic value of at least one hundred times as large as that of the connected standard resistor, means for connecting directly and non-reactively the impedance to be measured and said terminals in series with a selected standard resistor and its correlated limiting resistor, and switching means for selectively connecting a voltmeter across the selected standard resistor, across the impedance to be measured, and across the selected standard resistor and the impedance to be measured in series, respectively, to measure the individual and total voltage drops.

4. An impedance measuring device comprising a pair of input terminals adapted to be connected to an alternating power source, a range selector switch including two conjointly operable switch units each of which units has a plurality of stationary contacts and a movable contact for selectively making contact therewith, a plurality of standard resistors one end of each of which is connected to a respective stationary contact of the first switch unit, a plurality of current limiting resistors one end of each of which is connected to a respective stationary contact of the second switch unit, the other ends of the current limiting resistors being connected to the movable contact of the first switch unit whereby the correlated current limiting resistors can be connected in series with the selected standard resistors, means including the opposite ends of the standard resistors and the movable contact of the second switch unit for directly and non-reactively completing a series circuit including the input terminals, the impedance being tested, the selected standard resistor and its correlated limiting resistor, and switching means for selectively connecting directly and non-reactively a voltmeter across the selected standard resistor, across the impedance to be measured, and across the selected standard resistor and the impedance to be measured in series, respectively, to measure the individual and total voltage drops.

5. An impedance measuring device comprising a pair of input terminals adapted to be connected to an alternating power source; a standard resistor; a current limiting resistor connected in series with the standard resistor; a four pole three position voltmeter switch including four conjointly operable switch elements each of which has three stationary contacts and a movable contact for selectively making contact therewith, the movable contacts of the first and second switch elements being directly and nonreactively connected respectively to one end of the current limiting resistor and one end of the standard resistor, the first stationary contact of the second switch element and the second and third stationary contacts of the first switch element being directly and non-reactively connected with the first of said input terminals, the second input terminal being directly and non-reactively connected through the impedance being tested to the second and third stationary contacts of the second switch element and the first stationary contact of the first switch element so that in all three positions of the switch, respective circuits are completed between the input terminals which have substantially the same total value of electrical impedance thus maintaining the current through the test impedance substantially constant, the first and third stationary contacts of the third switch element being joined to the common connection between the standard resistor and the current limiting resistor, and the first stationary contact of the fourth switch element and the second stationary contact of the third switch element being direcly and non-reactively connected to the movable contact of the second switch element; and terminals for directly and non-reactively connecting the movable contacts of the third and fourth switch elements to a voltmeter, whereby the three positions of the switch connect the voltmeter to measure selectively the individual and total voltage drops across the standard resistor and the test impedance.

6. An impedance measuring device comprising a pair of input terminals adapted to be connected to an alternating power source; a range selector switch including two switch units conjointly operable each of which units has a plurality of stationary contacts and a movable contact for selectively making contact therewith; a plurality of standard resistors one end of each of which is directly and non-reactively connected to a respective stationary contact of the first switch unit; a plurality of current limiting resistors one end of each of which is directly and non-reactively connected to a respective stationary contact of the second switch unit, the other ends of the current limiting resistors being directly and non-reactively connected to the movable contact of the first switch unit whereby the correlated current limiting resistors can be directly and non-reactively connected in series with the selected standard resistors; a four pole three position voltmeter switch including four conjointly operable switch elements each of which elements has three stationary contacts and a movable contact for selectively making contact therewith, the movable contact of the first element being directly and non-reactively connected to the movable contact of the second selector switch unit, the movable contact of the second voltmeter switch element being directly and non-reactively connected to the opposite ends of the standard resistors to the ends connecting with the stationary contacts of the first selector switch unit, the first stationary contact of the second switch element and the second and third stationary contacts of the first switch elements being directly and non-reactively connected with the first of said input terminals, and the second input terminal being directly and non-reactively connected through the impedance being tested to the second and third stationary contacts of the second switch element and the first stationary contact of the first switch element, so that in all three positions of the voltmeter switch respective circuits are completed between the input terminals which have substantially the same total value of electrical impedance thus maintaining the current through the test impedance substantially constant, the first and third stationary contacts of the third switch element being joined to the common connection between the ends of the current limiting resistors, the first stationary contact of the fourth switch element and the second stationary contact of the third switch unit being connected to the movable contact of the second switch element; and terminals for directly and non-reactively connecting the movable contacts of the third and fourth switch elements to a voltmeter, whereby the three positions of the voltmeter switch connect the voltmeter to measure selectively the individual and total voltage drops across the selected standard resistor and the test impedance.

7. An impedance measuring device comprising a pair of input terminals adapted to be connected to an alternating power source; a current limiting resistor; one end of which is directly and non-reactively connected to one of said input terminals; a three pole, three position voltmeter switch including three conjointly operable switch elements each of which has three stationary contacts and a movable contact for selectively making contact therewith, the opposite end of the current limiting resistor being directly and non-reactively connected to the first stationary contact of the first switch element and the second and third stationary contacts of the second switch element, the first stationary contact of the second switch element and the second and third stationary contacts of the first switch element being directly and non-reactively connected to the other of said input terminals; a standard resistor, one end of which is directly and non-reactively connected to the movable contact of the second switch element and the third contact of the third switch element, the other end of the standard resistor being directly and non-reactively connected to the first and second stationary contacts of the third switch element and one end of the impedance being tested, and the movable contact of the first switch element being directly and non-reactively connected to the other end of the impedance being tested; and two voltmeter terminals, one of which is directly and non-reactively connected to the movable contact of the third switch element and the other of which is directly and non-reactively connected to said other input terminal, whereby the three positions of the voltmeter switch connect the voltmeter to measure selectively the individual and total voltage drops across the standard resistor and the test impedance.

8. An impedance measuring device comprising a pair of input terminals adapted to be connected to an alternating power source; a two pole multiposition range selector switch including two switch units each of which has a plurality of stationary contacts and a movable contact for selectively making contact therewith; a plurality of current limiting resistors, one end of each of which is directly and non-reactively connected with a respective stationary contact of the first switch unit, the opposite ends of the resistors being directly and non-reactively connected with one of the input terminals; a plurality of standard resistors, one end of each of which is directly and non-reactively connected with a respective stationary contact of the second switch unit; a three pole, three position voltmeter switch including three conjointly operable switch elements each of which has three stationary contacts and a movable contact for selectively making contact therewith, the movable contact of the first switch unit being directly and non-reactively connected to the first stationary contact of the first switch element and the second and third stationary contacts of the second switch element, the first stationary contact of the second switch element and the second and third stationary contacts of the first switch element being directly and non-reactively connected to other of said input terminals, the opposite ends of the standard resistors being directly and non-reactively connected to the movable contact of the second switch element and the third contact of the third switch element, the movable contact of the second switch unit being directly and non-reactively connected to the first and second stationary contacts of the third switch element and one end of the impedance being tested, and the movable contact of the first switch element being directly and non-reactively connected to the other end of the impedance being tested; and two voltmeter terminals, one of which is directly and non-reactively connected to the movable contact of the third switch element, the other of which is directly and non-reactively connected to said other input terminal, whereby the three positions of the voltmeter switch connect the voltmeter to measure selectively the individual and total voltage drops across the standard resistor and the correlated test impedance determined by the position of the range selector switch.

(References on following page)

References Cited in the file of this patent

UNITED STATES PATENTS

| Number | Name | Date |
|---|---|---|
| 899,193 | Shine | Sept. 22, 1908 |
| 1,684,403 | Mason | Sept. 18, 1928 |
| 1,917,417 | Zuschlag | July 11, 1933 |
| 2,547,926 | Cook | Apr. 10, 1951 |
| 2,593,175 | Packard et al. | Apr. 15, 1952 |
| 2,626,981 | Shiepe | Jan. 27, 1953 |

OTHER REFERENCES

Farmer: Electrical Measurements in Practice, McGraw-Hill Book Co., first edition, 1917, page 265.